United States Patent
Duh

(10) Patent No.: US 6,403,762 B1
(45) Date of Patent: Jun. 11, 2002

(54) SOLID STATE POLYMERIZATION PROCESS FOR POLY(TRIMETHYLENE TEREPHTHALATE) UTILIZING A COMBINED CRYSTALLIZATION/PREHEATING STEP

(75) Inventor: Ben Duh, Tallmadge, OH (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/891,909

(22) Filed: Jun. 26, 2001

Related U.S. Application Data

(60) Provisional application No. 60/226,790, filed on Aug. 21, 2000.

(51) Int. Cl.⁷ .................................................. C08F 6/00
(52) U.S. Cl. ..................... 528/503; 528/272; 528/492; 528/502
(58) Field of Search ..................... 528/272, 492, 528/502, 503

(56) References Cited

U.S. PATENT DOCUMENTS

| | | | |
|---|---|---|---|
| 4,161,578 A | 7/1979 | Herron | 528/272 |
| 4,374,975 A | 2/1983 | Duh | 528/272 |
| 4,532,319 A | 7/1985 | Wendling | 528/274 |
| 5,292,865 A | 3/1994 | Kerpes et al. | 528/492 |
| 5,296,587 A | 3/1994 | Sumner, Jr. et al. | 528/281 |
| 5,340,909 A | 8/1994 | Doerr et al. | 528/276 |
| 5,408,035 A | 4/1995 | Duh | 528/480 |
| 5,459,229 A | 10/1995 | Kelsey et al. | 528/275 |
| 5,536,810 A | 7/1996 | Thiele | 528/481 |
| 5,552,513 A | 9/1996 | Bhatia | 528/308.3 |
| 5,599,900 A | 2/1997 | Bhatia | 528/491 |
| 5,663,281 A | 9/1997 | Brugel | 528/272 |
| 5,786,443 A | 7/1998 | Lowe | 528/272 |
| 5,811,496 A | 9/1998 | Iwasyk et al. | 525/444 |
| 5,872,204 A | 2/1999 | Kuo et al. | 528/279 |
| 5,891,985 A | 4/1999 | Brugel | 528/283 |
| 6,297,315 B1 * | 10/2001 | Duh et al. | 524/605 |

FOREIGN PATENT DOCUMENTS

| | | |
|---|---|---|
| GB | 1557337 | 5/1979 |
| WO | WO 98/23662 | 6/1998 |
| WO | WO 99/11709 | 11/1999 |

OTHER PUBLICATIONS

"PET SSP: One of the Key Steps in PET Manufacturing," Paper presented in Buhler Pro Tech Forum '96, Uzwil, Switzerland, Jun. 20–21, 1966.

* cited by examiner

Primary Examiner—Samuel A. Acquah
(74) Attorney, Agent, or Firm—Donald F. Haas

(57) ABSTRACT

The present invention is an improvement upon the process for producing poly(trimethylene terephthalate) (PTT) wherein 1,3-propanediol (PDO), and optionally other diols, and an aromatic diacid or diester thereof, and optionally other diacids or diesters, are esterified or transesterified and the esterification or transesterification product is polycondensed to produce a prepolymer which is solid state polymerized to produce a polymer with a desired intrinsic viscosity (IV). The prior art process includes the SSP prereaction steps of crystallization, drying/annealing, and preheating. The improvement in the present invention comprises crystallizing and preheating the PTT polymer in one step, without a drying/annealing step in between. Thus, the prepolymer still has a substantial moisture content when it is first exposed to the SSP reaction temperature inside the crystallizer/preheater.

6 Claims, 2 Drawing Sheets

SOLID STATE POLYMERIZATION PROCESS FOR POLY(TRIMETHYLENE TEREPHTHALATE) UTILIZING A COMBINED CRYSTALLIZATION/ PREHEATING STEP

This application claims the benefit of U.S. Provisional Application No. 60/226,790 filed Aug. 21, 2000, the entire disclosure of which is hereby incorporated by reference.

FIELD OF THE INVENTION

This invention relates to a process for the production of the polyester poly(trimethylene terephthalate) (PTT) from 1,3-propanediol (PDO) and an aromatic diacid or dialkyl ester thereof by melt polymerization followed by solid state polymerization (SSP). More particularly, this invention relates to an improved method of preparing the melt polymerized prepolymer for solid state polymerization.

BACKGROUND OF THE INVENTION

Poly(trimethylene terephthalate) is a new polyester with a unique combination of properties that are particularly suitable for carpet and textile fiber applications. The molecular weight of poly(trimethylene terephthalate) required for fiber applications is between 18,000 and 22,000 which is equivalent to an intrinsic viscosity (IV) between 0.80 and 0.94 dl/g as measured in a 60/40 phenol/tetrachloroethane solvent at 30° C. Up to the present time, it has been found to be very difficult and very expensive to produce PTT with such an IV and good color by melt phase polymerization alone. Thus, it is desirable to use a combined melt/solid state polymerization process to produce high quality PTT for fiber applications.

First a PTT prepolymer with an intermediate IV is produced by melt polymerization. The prepolymer pellets thus produced are further polymerized in solid state to the desired IV. In the case of the much more well-known poly(ethylene terephthalate) (PET), a resin with a molecular weight of 20,000 (or an IV of 0.63 dl/g) for textile fiber applications can be produced by melt polymerization alone. However, solid state polymerization has been widely used to produce PET resins with IV's higher than 0.70 dl/g for bottle, food tray, and tire cord applications.

U.S. Pat. Nos. 4,374,975 and 5,408,035 describe a standard continuous SSP process for the production of polyethylene terephthalate (PET) after melt polycondensation. This is essentially the same process which is currently used commercially for PTT. Prepolymer granules or pellets are first crystallized in a crystallization unit. Then the crystallized pellets are dried and annealed in a dryer/annealer apparatus. The dried and annealed pellets are then preheated to the reaction temperature for SSP in the preheater apparatus. Then the pellets are charged to the reactor where they undergo further polycondensation in the solid state as they move down the reactor and the final solid stated product pellets are discharged from the reactor and then cooled in a product cooler to a temperature suitable for shipping or storage.

PET prepolymer in granular form is first crystallized in the crystallizer at a temperature of 150 to 180° C. to raise its sticking temperature. During a residence time of 5 to 30 minutes, depending on the type of the crystallizer used, the crystallinity of the PET prepolymer is increased to 30 to 40 percent. The crystallized PET pellets are then dried and annealed for 1 to 4 hours (typically 2 to 3 hours) in a dryer/annealer. The dryer/annealer is a moving-bed hopper, wherein the prepolymer pellets move down slowly by gravitational force in contact with a stream of hot air or nitrogen which flows upwardly to sweep away the moisture given off by the prepolymer pellets. The moisture content of the prepolymer pellets is reduced to below 0.01 percent in the dryer/annealer with little change in temperature. In some variations of SSP processes (e.g., SSP processes provided by Hosokawa Bepex Corporation of Minneapolis, Minn. and Sinco Engineering S.p.A. of Tortona, Italy), the moving-bed hopper is replaced by a horizontal agitated heater, wherein the prepolymer pellets are slowly propelled forward by the agitators and heated to a substantially higher temperature. The drying is required to prevent hydrolytic degradation during the subsequent preheating and reaction steps, wherein the prepolymer is exposed to SSP reaction temperature. For simplicity, SSP reaction temperature is defined as a temperature equal to or higher than the nominal SSP reactor temperature. Since the preheater must heat the prepolymer to the reaction temperature, the prepolymer is first exposed to the reaction temperature in the preheater. Hydrolytic degradation of a polyester is a depolymerization reaction which lowers the intrinsic viscosity (IV) of the polyester. Although hydrolytic degradation usually does not significantly affect the final product quality, it can substantially increase the SSP time required to achieve the necessary product IV. It should be noted that at temperatures where hydrolytic degradation takes place, polycondensation also takes place. The combined effects may result in a net IV drop or increase. According to U.S. Pat. No. 4,374,975, it is necessary to reduce the moisture content of the prepolymer to below 0.01 percent prior to its exposure to the reaction temperature to limit the hydrolytic degradation of the PET granules to an acceptable extent. During drying, annealing (the morphological transformation which further increases crystallinity and reduces pellet sticking tendency) also takes place.

The dried and annealed PET granules are then preheated to the SSP reaction temperature, usually between 210 and 220° C. During the preheating step, the PET granules become sticky because of the rapid rise of polymer temperature. Therefore a preheater, which can be a fluid bed or an agitated heat transfer unit, must also provide agitation or forced motion to prevent agglomeration of PET granules. The residence time in the preheater ranges from a few minutes to about 60 minutes, depending on the type of the preheater used.

The preheated pellets discharged from the preheater enter the moving-bed solid state reactor. Inside the reactor, the pellets move downward slowly by gravitational force while undergoing polycondensation in the solid state. The reactor provides sufficient residence time for the polyester to achieve the required product IV.

Thus it can be seen that the standard or conventional SSP process for PET comprises several prereaction steps with a long total treatment time (up to several hours) and is characterized by the minimal moisture content (below 0.01 percent) of the prepolymer when the prepolymer is exposed to the reaction temperature. The purpose of these prereaction steps is to reduce polymer sticking tendency and to prevent hydrolytic degradation. If amorphous PET prepolymer is directly exposed to the preheating or reaction temperature of 200 to 230°, severe pellet sticking or lumping and hydrolytic degradation will occur. The importance of drying the PET before exposing it to the reaction temperature is demonstrated in U.S. Pat. No. 4,374,975. The examples show that an insufficiently predried resin with a moisture content of higher than 0.01 percent at the time it is exposed to the reaction temperature underwent significant IV drop within the first 30 minutes of the exposure.

Surprisingly, I have discovered, in contrast to the behavior of PET in the SSP process, PTT prepolymer pellets can be directly exposed to the preheating or reaction temperature without significant polymer sticking and depolymerization problems. This makes it possible to drastically simplify the prereaction steps for the SSP of PTT. The present invention describes such a simplified SSP process.

SUMMARY OF THE INVENTION

The present invention is an improvement upon the process for producing poly(trimethylene terephthalate) (PTT) wherein 1,3-propanediol (PDO), and optionally other diols, and an aromatic diacid or diester thereof, and optionally other diacids or diesters, are esterified or transesterified and the esterification or transesterification product is polycondensed to produce a prepolymer which is then solid state polymerized to produce a polymer with a desired intrinsic viscosity (IV). The prior art process includes the SSP prereaction steps of crystallization, drying/annealing, and preheating. The improvement in the present invention comprises crystallizing and preheating the PTT polymer in one step, without drying/annealing of the polymer. Thus, the temperature of the prepolymer is exposed to the SSP reaction temperature but the prepolymer still has a substantial moisture content, i.e., greater than 0.01% by weight, when it is first exposed to the reaction temperature in the crystallization/preheating vessel.

DETAILED DESCRIPTION OF THE INVENTION

Figure 1:
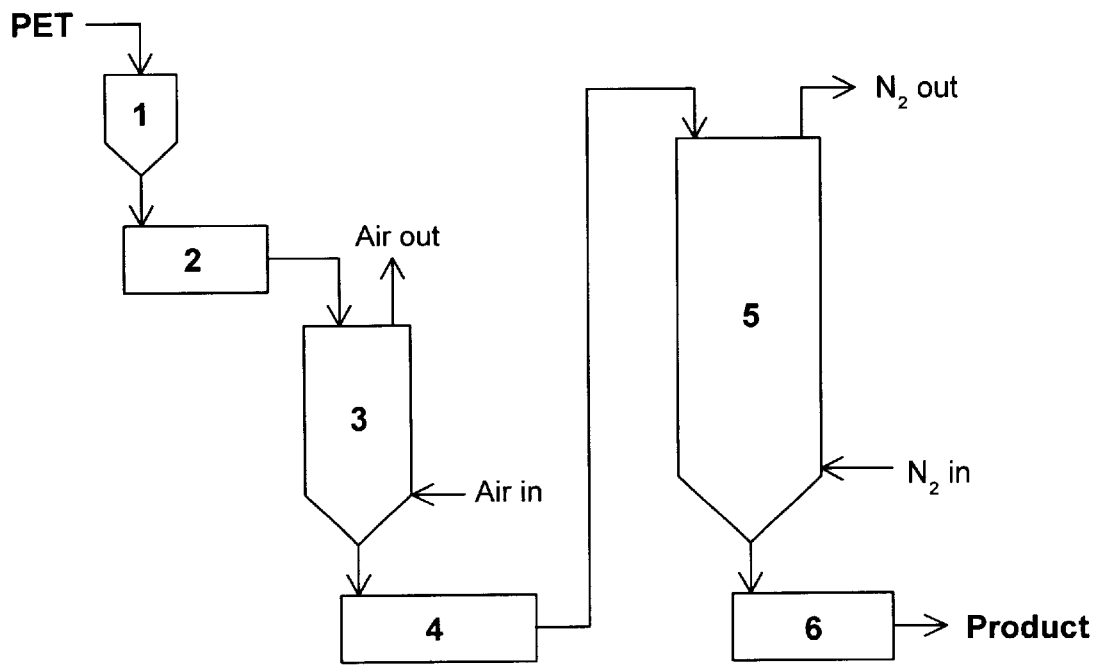
FIG. 1 shows the schematic of a conventional SSP process for PET.

This process produces a 1,3-propanediol-based aromatic polyester, specifically poly(trimethylene terephthalate) (PTT). This refers to a polyester prepared by reacting 1,3-propanediol with at least one aromatic diacid or alkyl diester thereof. Preferably, the reactant diacid or alkyl diester is terephthalic acid (TPA) or dimethyl terephthalate (DMT).

As used herein, "1,3-propanediol-based aromatic polyester" refers to a polyester prepared by the condensation polymerization reaction of one or more diols with one or more aromatic diacids or alkyl diesters thereof (herein referred to collectively as "diacid") in which at least 80 mole percent of the diol(s) is 1,3-propanediol. "Poly(trimethylene terephthalate)" refers to such a polyester in which at least about 80 mole percent of the diacid(s) moiety is that of terephthalic acid. Other diols which may be copolymerized in such a polyester include, for example, ethylene glycol, diethylene glycol, 1,4-cyclohexane dimethanol, and 1,4-butanediol; and other aromatic and aliphatic acids which may be copolymerized include, for example, isophthalic acid and 2,6-naphthalene dicarboxylic acid. The poly (trimethylene terephthalate) may contain additives (such as stabilizer, toner, and dye), and delustrant, etc., added during the melt polycondensation stage to impart the desired properties. Most poly(trimethylene terephthalate) products for fiber applications contain up to several weight percent titanium dioxide delustrant.

Numerous processes are known to prepare polyesters. Such processes may be batchwise or continuous and may employ one or two stages. In general, such processes have in common the reaction at elevated temperature of a diol and an aromatic diacid or dialkyl ester thereof, with the removal of byproduct water or alcohol, for a time effective to produce a polyester having an intrinsic viscosity (IV) suitable for the desired application.

In this invention, the poly(trimethylene terephthalate) polyester is prepared in a two-stage condensation polymerization process. The first stage is melt polycondensation and the second stage is solid state polycondensation. Depending on the precursors used, there are two melt polycondensation processes, namely the TPA process and the DMT (dimethyl terephthalate) process. Each melt polycondensation process comprises two steps. While the first steps are different, the second steps are similar.

The first step of the TPA process is an esterification step wherein a molar excess of at least one diol, specifically 1,3-propanediol, is reacted with at least one diacid, specifically TPA, usually in the absence of added catalyst, at temperatures within the range of about 230 to 270° C. under a super-atmospheric pressure within the range of about 30 to about 80 psia. The esterification product is a mixture of oligomers of bis(3-hydroxypropyl) terephthalate (BHPT), with a degree of polymerization of 3 to 10, if PDO is the only diol and TPA is the only diacid used. During esterification, byproduct water is continuously removed from the reactor.

The first step of the DMT process is a transesterification step, wherein at least one diol, specifically PDO, is reacted with at least one dialkyl ester of a diacid, specifically DMT, in the presence of a suitable transesterification catalyst such as zinc acetate, magnesium acetate, or titanium alkanoate, at temperatures within the range of about 180 to about 250° C. under near atmospheric pressure. The transesterification product is also a mixture of the oligomers of BHPT if PDO is the only diol and DMT is the only diester used. The transesterification generates methanol as the byproduct which is continuously distilled off.

The second step of melt polymerization is the polycondensation step, wherein the pressure on the reaction mixture is reduced and a polycondensation catalyst is added. The preferred polycondensation catalysts are compounds of titanium, antimony, or tin, such as titanium butoxide, present in an amount within the range of 10 to 400 ppm titanium, antimony, or tin, based on the weight of the polymer. The low molecular weight product of the esterification or transesterification step is heated in this polycondensation step at a temperature within the range of about 240 to 300° C. under a vacuum for a time sufficient to increase the IV of the polycondensate to at least about 0.25 dl/g (equivalent to number average molecular weight of 4,300), while the major byproduct of polycondensation, PDO, is removed.

The product of the previous step is pelletized, using a strand pelletizer, an underwater pelletizer, or a drop-forming device, and then transferred to a solid state polymerization section in order to further polymerize the polymer to increase the intrinsic viscosity to the desired level, usually in the range of 0.80 to 0.94 dl/g, which is required for fiber applications. The relatively low IV polymer produced by a melt polymerization process and intended to be further polymerized in solid state is referred to as the prepolymer.

A combination of melt polymerization and solid state polymerization processes has been preferred over a melt polymerization process alone for the production of PTT for fiber applications for reasons of process economics and product quality. Although PTT and PET have similar properties, in general, PTT is substantially less stable and therefore more susceptible to thermal degradation than PET during the melt polycondensation step. To limit degradation of PTT, a melt polycondensation temperature at least 30° C. lower than that for the production of PET has to be used. Consequently, a polycondensation time several times longer than for PET and a disk ring type polycondensation reactor several times larger than for PET are required for PTT. This leads to a very expensive process if a melt polymerization process alone is to be used to produce PTT for fiber applications. Furthermore, even with such a lower polycondensation temperature, the long residence time required to achieve the desired IV will result in inferior product properties, especially color. By terminating melt polymerization earlier, to limit thermal degradation, and further polymerizing the melt polycondensation product in solid state at a much lower temperature to the IV suitable for the desired application, better overall process economics and better product quality, especially in terms of color, can be achieved.

The solid state polymerization may be carried out in a similar manner as has been used for PET such as described in U.S. Pat. Nos. 4,161,578 and 5,408,035, which are herein incorporated by reference, and in "PET SSP: One of the Key Steps in PET Manufacturing," presented in Pro Tech Forum '96, Jun. 20–21, 1996, sponsored by Buhler Limited, Uzwil, Switzerland. As described in these references, the standard continuous PET solid state polymerization process can be broken down into five steps, crystallization, drying/annealing, preheating, solid state polymerization, and product cooling. The solid state polymerization of PTT is carried out in generally the same manner.

FIG. 1 illustrates a conventional SSP process for PET. PET prepolymer granules or pellets from the feed hopper 1 are first crystallized in the crystallizer 2. The crystallized pellets are then dried and annealed in the dryer/annealer 3. The dried and annealed pellets are then preheated to the reaction temperature in the preheater 4 before being charged into the reactor 5. The preheated pellets undergo further polycondensation in solid state as they move down the reactor. The solid stated product pellets discharged from the bottom of the reactor are then cooled in the product cooler 6 to a temperature suitable for shipping or storage.

Figure 2:
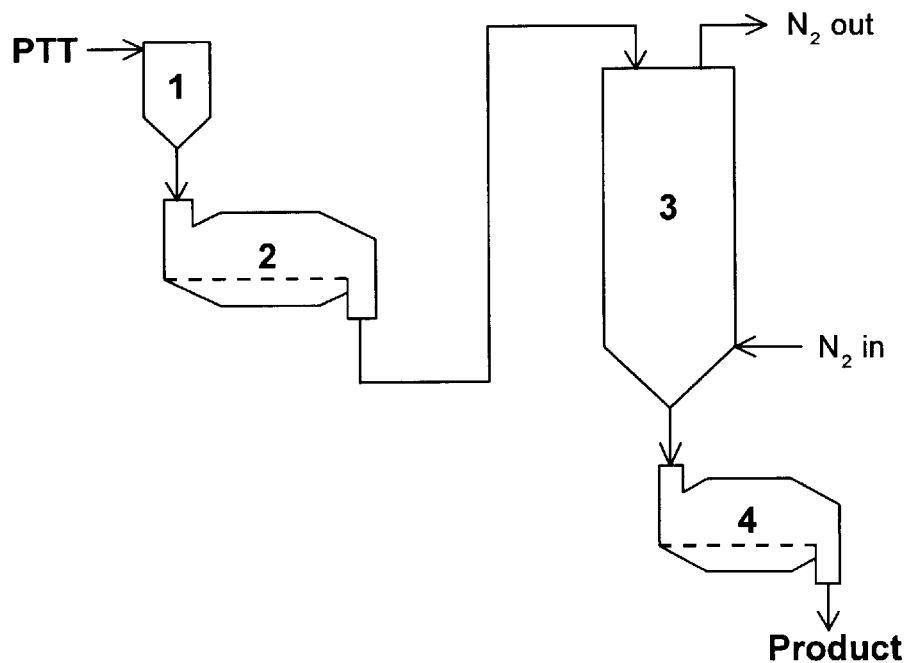
FIG. 2 shows a schematic of the combined crystallization/preheating SSP process for PTT of the present invention.

FIG. 2 illustrates the preferred process of the present invention for preparing PTT polymer pellets for solid state polymerization. "Wet" or undried PTT prepolymer pellets produced by a melt polymerization process are continuously discharged from the feed hopper 1 into the crystallizer/preheater 2 in which the prepolymer pellets are rapidly crystallized and preheated to the reaction temperature, which is between about 180° C. and up to about 1° C. below the melting temperature of the polymer, for a short residence time of 5 to 60 minutes, preferably 10 to 30 minutes.

The crystallizer/preheater may be a fluid bed or an agitated heat exchanger. Suitable types of fluid beds include standard (stationary) fluid beds, vibrating fluid beds, and pulsating fluid beds. Multiple heating zones may be used to narrow the residence time distribution of the polymer pellets as well as to improve energy efficiency. In the single-zone crystallizer/preheater, the temperature of the direct heat transfer medium (i.e., hot nitrogen or hot air in a fluid bed) or the heat transfer surface (of an agitated heat exchanger) is at least as high as the intended reactor temperature. Thus the prepolymer is exposed to the reaction temperature as soon it is charged into the single-zone crystallizer/preheater. In a multiple-zones crystallizer/preheater, the heat transfer medium or heat transfer surface temperature of the first zone may be lower or no lower than the desired reactor temperature. Thus the prepolymer may be exposed to the reaction temperature in the first or later zones of the multiple-zones crystallizer/preheater. Because this improved SSP process does not have a prolonged drying step as in the conventional SSP process, the prepolymer still contains a substantial amount of moisture when it is exposed to the reaction temperature in the multiple-zone crystallizer/preheater, regardless of what heat transfer medium or surface temperature is used in the first zone. The crystallization/preheating of the PTT pellets may be conducted in an atmosphere of air or nitrogen and the exhaust air or nitrogen used may be recycled after cleanup.

The crystallized and preheated pellets are discharged from the crystallizer/preheater into the reactor 3. Inside the reactor, solid state polycondensation takes place as the polymer pellets move downward by gravitational force in contact with a stream of inert gas, usually nitrogen, which flows upwardly to sweep away the reaction byproducts, such as 1,3-propanediol, water, allyl alcohol, acrolein, and cyclic dimer. The nitrogen flow rate is from 0.25 to 1.0 pound per pound of polymer and the nitrogen may be heated or unheated before entering the bottom of the reactor. The exhaust nitrogen exiting the top of the reactor may be recycled after purification.

The polymer pellets attain the required IV for the intended applications as they are discharged from the bottom of the reactor. The solid stated product is then cooled in the product cooler 4, which may be a fluid bed or an agitated heat exchanger, to below 65° C. for shipping or storage. The product may be cooled in an atmosphere of nitrogen or air.

The PTT polymer enters the crystallizer/preheater without any pretreatment. Depending on the initial moisture content of the prepolymer and the design of the crystallizer/preheater, when the prepolymer is first exposed to the reaction temperature in this vessel, its moisture content usually ranges from about 0.02 to about 0.50 percent by weight, which is a substantial moisture content as compared to the moisture content limitation which is placed upon PET pellets, below 0.01 percent by weight to prevent hydrolytic degradation. In the present invention for PTT, the PTT pellets maintain a substantial moisture content when they are exposed to the reaction temperature. It is not the intention of the present process to avoid hydrolytic depolymerization while the pellets still have a significant moisture content. Instead, the present invention allows hydrolytic depolymerization to take place in the crystallization/ preheating unit and the upper part of the reactor while taking advantage of the fast SSP rate of PTT to compensate for the depolymerization. Therefore, this SSP process for PTT requires only a slightly larger reactor than for PET.

EXAMPLES

Comparative Example 1

A laboratory SSP reactor made of a 24-inch (60.1 centimeters) long glass tube with a diameter of about 1.25 inches (3.2 centimeters) was used to conduct the SSP experiment for this example. This reactor had a cone-shaped bottom, which was connected to a small purge-gas supply tube. The reactor can be operated as a fluid-bed or a fixed-bed reactor according to the flow rate of the purge gas used. Whenever fluidization was called for, a nitrogen flow rate of about 90 standard cubic feet (2.55 cubic meters) per hour (SCFH) was used. Otherwise, a flow rate of about 16 SCFH (0.45 cubic meters per hour) was used to maintain a fixed bed. Nitrogen was used exclusively as the purge gas although air could have been used during the crystallization and drying/annealing steps. During the experimental run, the reactor was immersed in a thermostated transparent oil bath which heated the reactor as well as the incoming nitrogen. Although only a single laboratory reactor was used, the experimental run simulated the continuous SSP process steps quite well. This example was designed to simulate the conventional SSP process.

A PTT prepolymer with an IV of 0.535 dl/g (equivalent to number average molecular weight of 11,000) and containing 60 ppm Ti catalyst was first prepared in a melt polymerization reactor. The prepolymer melt was extruded from the bottom of the melt reactor into melt strands which were quenched and solidified in cold water and pelletized. The prepolymer pellets thus obtained were virtually transparent. Based on the appearance of the prepolymer pellets, one would think that they were completely amorphous. However, a DSC scan of the pellets surprisingly revealed that these clear pellets had a crystallinity of 26.5% (based on heat of fusion for PTT crystal=147 j/g). This was substantially higher than the 3–8% crystallinity of typical PET prepolymer. This PTT prepolymer had a $T_g$ of about 45° C., a melting temperature of about 228° C., and a moisture content of 0.257%.

Initially the oil temperature was controlled at 175° C. About 100 grams of PTT prepolymer pellets were charged into the reactor and a stream of nitrogen, sufficient to fluidize the PTT pellets in the reactor, was passed through the reactor to simulate the crystallization step which lasted 8 minutes. The pellets became sticky and the bed ceased to fluidize momentarily as the polymer temperature reached about 60–70° C. As the pellets crystallized and turned opaque within 30 seconds, the bed resumed fluidization by itself. Note that in a continuous operation, fluidization will not be interrupted because there will always be more already crystallized pellets than uncrystallized pellets in the bed to reduce the sticking tendency. At the completion of the crystallization step the crystallinity was increased to 46% with little change in IV.

After the crystallization step, the nitrogen flow was reduced to about 16 SCFH (0.45 cubic meters per hour) to maintain a fixed bed and the oil temperature was held at 175° C. for another 60 minutes to simulate the drying/annealing step. At the end of the drying/annealing step, the moisture content was reduced to 0.007% and the crystallinity was increased to 49%. Then the oil temperature was quickly raised to 215° C. and the nitrogen flow rate was again increased to fluidize the PTT pellets to simulate the preheating step which lasted 10 minutes. During the preheating step, no interruption of fluidization of the polymer bed occurred, the IV increased slightly, and the crystallinity remained approximately unchanged due to the short residence time and the rapid temperature rise. After the preheating step, the nitrogen flow was again reduced to 16 SCFH (0.45 cubic meters per hour) to maintain a fixed bed and the oil temperature was held at 215° C. to effect the reaction step which lasted until a total run time of 8 hours was reached. During the reaction step, no pellet sticking occurred although the bed remained stationary.

Figure 3:
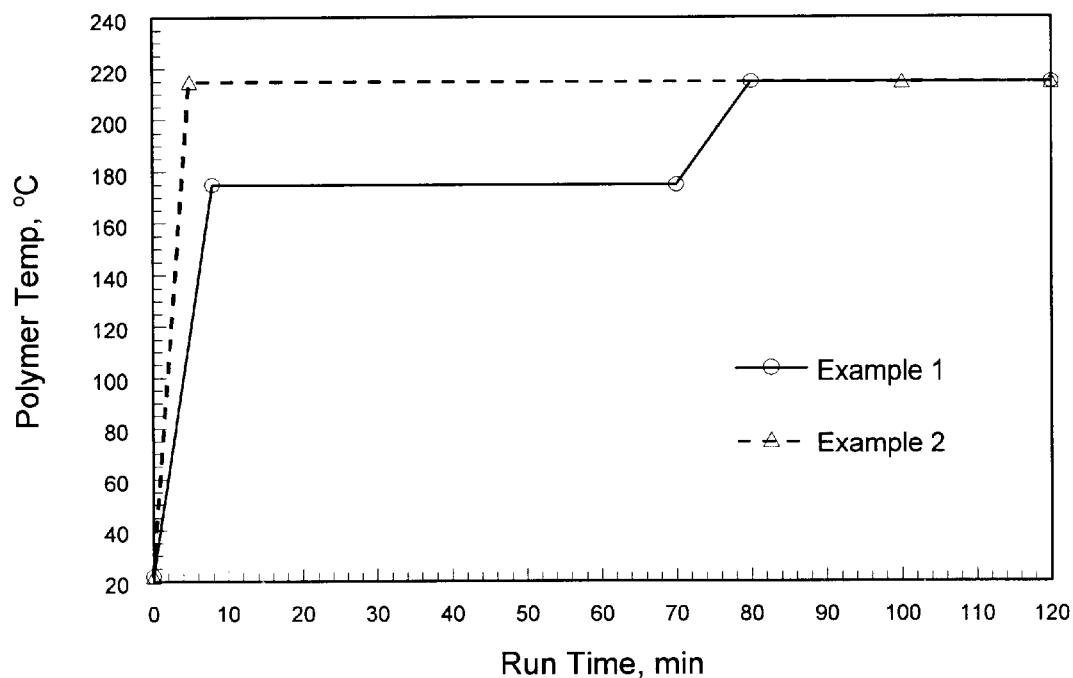
FIG. 3 gives the temperature profile for Examples 1 and 2.
Figure 4:
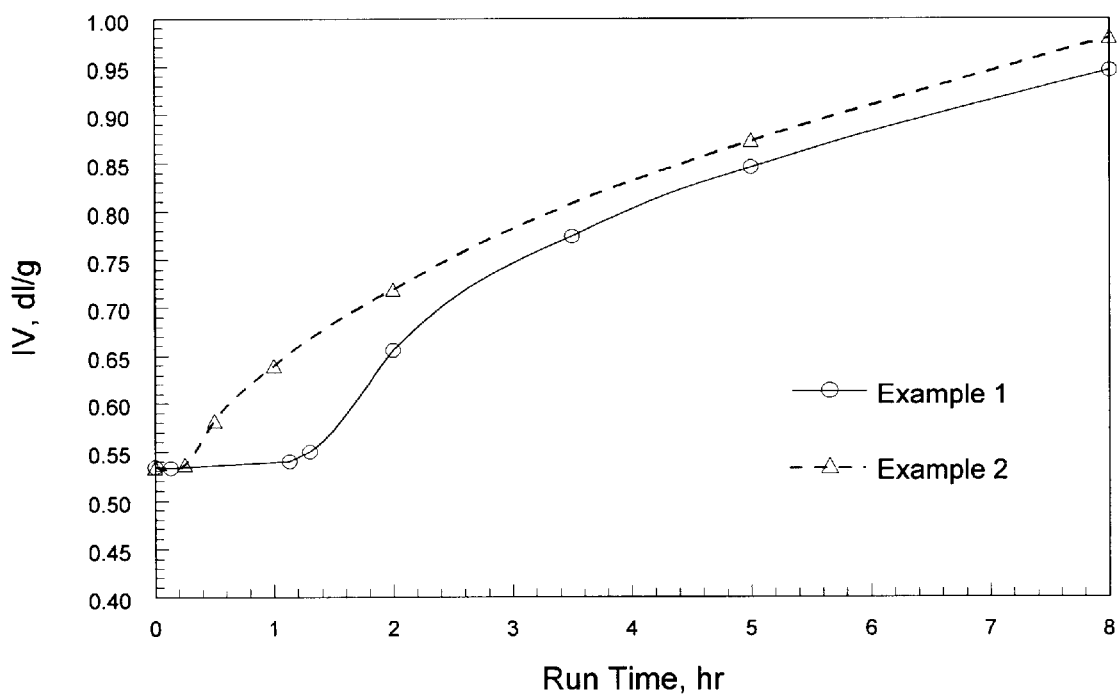
FIG. 4 shows the intrinsic viscosity build-up curve for Examples 1 and 2.

Throughout the experimental run, the polymer bed temperature was monitored with a thermocouple and samples were taken at various intervals to test for IV's. The polymer temperature profile during the first two hours and the IV build-up curve for the entire run are shown in FIGS. 3 and 4, respectively.

Example 2

The same PTT prepolymer and SSP apparatus used in this example were the same as in Example 1. This example was designed to simulate the improved SSP process for PTT utilizing a short combined crystallization/preheating step according to this invention.

The experimental run started with an oil temperature of 215° C., which was also the reaction temperature, and a stream of fluidizing nitrogen at a flow rate of 90 SCFH (2.55 cubic meters per hour) and with a temperature of 215° C. to simulate the combined crystallization/preheating step. Although the PTT pellets also went through a brief sticky stage as they were crystallized, no lasting pellet agglomeration occurred and fluidization was self-sustained.

Note that the prepolymer pellets with a high moisture content of 0.257% came in direct contact with the hot nitrogen at the reaction temperature as soon as they were charged into the fluid bed. The polymer bed temperature reached 215° C. in about 5 minutes. Thereafter, the nitrogen flow was reduced to about 16 SCFH (0.45 cubic meters per hour) and the oil temperature was held constant at 215° C. to simulate the reaction step which also lasted until a total run time of 8 hours was reached. During the entire reaction step, no pellet sticking occurred. In this example, "wet" PTT pellets were exposed to the reaction temperature without a pretreatment. The combined crystallization/preheating step lasted only 5 minutes during which the polymer crystallinity was increased to 44% and the polymer temperature was raised to 215° C.

As in Comparative Example 1, throughout the entire run, the bed temperature was monitored and samples were taken at various intervals. The polymer temperature profile and the IV build-up curve for this example are compared with those for Comparative Example 1 in FIGS. 3 and 4, respectively.

Two surprising discoveries were made in this example. First, without a "pre-crystallization" step and an annealing step at milder temperatures beforehand, no lasting pellet sticking occurred when PTT pellets were exposed to the reaction temperature in the combined crystallization/preheating step. We attribute this observation to the higher pre-existing crystallinity of the prepolymer, the faster crystallization rate, and the faster morphological transformation of PTT vs. PET. Secondly, as can be seen in FIG. 4, there was no net IV drop during the crystallization/preheating step and the early stage of SSP in Example 2 as would be expected for PET (as described in U.S. Pat. No. 4,374,975). This does not mean that depolymerization due to hydrolytic degradation does not occur when "wet" PTT is exposed to the reaction temperature. Rather, this means that, for PTT, at the reaction temperature the rate of polycondensation is always at least equal to the rate of depolymerization due to hydrolytic degradation even though the prepolymer has such a high moisture content when it is exposed to the reaction temperature. Furthermore, in the later stages of SSP, after the polymer in Example 2 was sufficiently dried in the reactor, it polymerizes at about the same rate as the polymer in Comparative Example 1. This is also in contrast to the observation of the SSP of "wet" PET which proceeds at a significantly lower rate than the pre-dried PET in the later stages of SSP as demonstrated in U.S. Pat. No. 4,374,975. From FIG. 4, it can be estimated that it took about 6.3 hours of total run time in Example 2 to achieve a product IV of 0.92 dl/g, compared with 7.2 hours in Comparative Example 1. Based on reactor residence time (SSP time after polymer temperature reached 215° C.), it took about 5% longer in Example 2 than in Comparative Example 1 (6.2 hours vs. 5.9 hours). This means the effect of high moisture content during the crystallization/preheating and the early stage of SSP on the overall SSP rate is small for PTT. Thus the only disadvantage of the improved SSP process for PTT is a slightly longer reactor residence time requirement which adds very little to the cost of the reactor system. On the other hand, there is only one single pre-reaction step with a short residence time of about 5 minutes in Example 2 versus three pre-reaction steps with a total residence time of 78 minutes in Example 1. The advantages of the improved SSP process in the simplification of the pre-reaction step and the capital savings of process equipment upstream of the reactor greatly outweigh the disadvantage of a slightly higher reactor cost.

Example 3

PTT prepolymer pellets with an IV of 0.65 dl/g (equivalent to a number average molecular weight of 14,000), a particle size of 2.85 g/100, and a moisture content of 0.287% were solid state polymerized in a continuous pilot plant. Major components of the pilot plant actively used in the experimental run included a feed hopper, a vibrating fluid-bed heater, a moving-bed reactor, and a vibrating fluid-bed cooler. The vibrating fluid-bed heater, which was used as the crystallizer/preheater during the run, had a 4" (10.2 centimeters)×36" (91.4 centimeters) perforated deck with $7/64$" (2.778 millimeters) diameter holes. Hot air at a flow rate of about 4 lbs. per lb. (4 kilograms per kilogram) of polymer was used as the heat transfer medium to heat the polymer during the run. The high air velocity through the deck holes in combination with the vibrating action of the unit fluidized the polymer pellets to promote the heat transfer and prevent sticking of pellets. The vibrating action also caused the pellets to move across the bed in near plug flow with nearly uniform residence time in this vessel. The reactor was an insulated hopper-type vessel with a diameter of 24 inches (60.96 centimeters) and a straight side of 13 feet (3.95 meters). The reactor was equipped with load cells to monitor the polymer weight and a mechanical discharger to discharge the product pellets at a desired rate. The reactor residence time could be readily determined from the weight of the polymer inside the reactor and the discharge rate. Near the bottom of the reactor there was a nitrogen distribution ring to distribute the incoming nitrogen uniformly across the cross-section of the reactor. The vibrating fluid-bed cooler had identical dimensions as the fluid-bed heater. It was used as the product cooler during the run. Cold air was used to cool the product discharged from the reactor.

During the continuous SSP run, PTT prepolymer pellets were discharged from the feed hopper through a screw discharger into the vibrating fluid-bed heater at a nominal throughput rate of 100 lbs/hr (45.36 kilograms per hour). Hot air preheated to 205° C., which was the maximum hot air temperature attainable with the air heater used and the intended reaction temperature, was blown through the fluid bed. The bed provided a residence time of about 12 minutes during which the PTT pellets were crystallized to a crystallinity of 46% and heated to about 205° C. From time to time, a polymer sample was discharged through the sampling port near the fluid-bed outlet into an insulated container and a thermocouple and an infrared thermometer were used to positively determine the polymer temperature. The thermocouple and the infrared thermometer gave approximately equal readings. The crystallized and preheated pellets were discharged from the fluid bed through an air-lock valve into the reactor. A stream of nitrogen, also preheated to 205° C., was passed through the reactor via the nitrogen distribution ring to remove the reaction by-products from the reactor. The SSP product from the bottom of the reactor was discharged through the mechanical discharger into the product cooler also at a nominal rate of 100 lbs/hr (45.36 kilograms per hour). The product cooler cooled the product to about 50° C. After the process lined out, the production ran smoothly without pellet sticking in the crystallizer/preheater or in the reactor. A product IV of about 0.98 dl/g was achieved with a reactor residence time of about 13 hours.

I claim:

1. In a process for producing poly(trimethylene terephthalate) wherein 1,3-propanediol, and optionally other diols, and an aromatic diacid or diester thereof, and optionally other diacids or diesters, are esterified or transesterified and the esterification or transesterification product is polycondensed to produce a prepolymer which is solid state polymerized to produce a polymer with a desired intrinsic viscosity, the improvement which comprises crystallizing and preheating the prepolymer in one step, without the usual drying/annealing of the polymer, to the solid state polymerization reaction temperature, wherein the prepolymer has a substantial moisture content when it is first exposed to the reaction temperature, and introducing the prepolymer into a solid state polymerization reactor.

2. The process of claim 1 wherein the crystallization/preheating is conducted in one vessel with one heating zone or multiple heating zones.

3. The process of claim 1 wherein the residence time of the prepolymer in a crystallizer/preheater is between 5 to 60 minutes.

4. The process of claim 3 wherein the residence time of the prepolymer in the crystallizer/preheater is from 10 to 30 minutes.

5. The process of claim 1 wherein the moisture content of the prepolymer is substantially higher than 0.01 percent by weight when it is first exposed to the reaction temperature in a crystallizer/preheater.

6. The process of claim 5 wherein the moisture content of the prepolymer is from 0.02 to 0.50 percent by weight when it is first exposed to the reaction temperature in the crystallizer/preheater.

* * * * *